Jan. 13, 1925.
C. BORNMANN
1,522,996
FINDER FOR CAMERAS
Filed Oct. 31, 1922    2 Sheets-Sheet 1
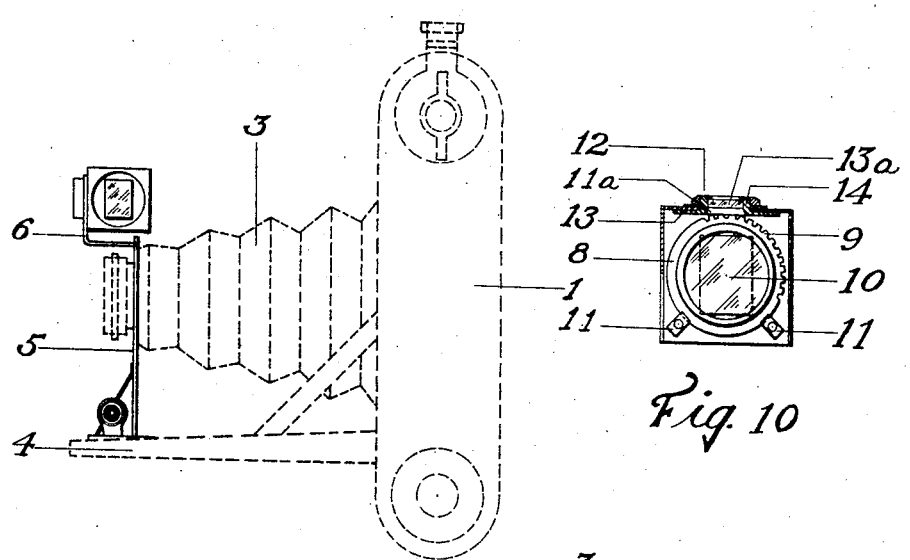
Fig. 1
Fig. 10
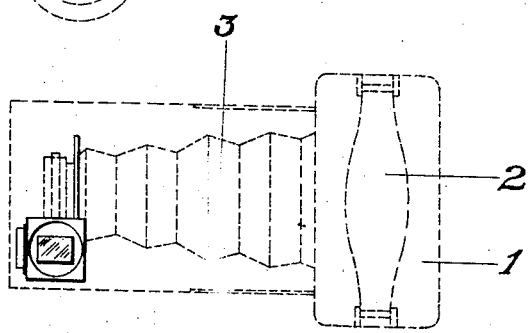
Fig. 2
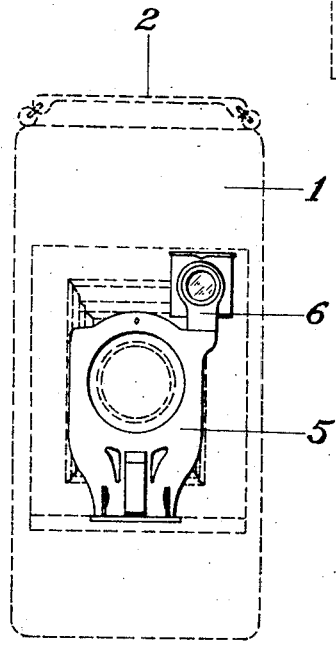
Fig. 3
INVENTOR
CARL BORNMANN
BY
Philip S. Hopkins
ATTORNEY Jan. 13, 1925.

C. BORNMANN

FINDER FOR CAMERAS

Filed Oct. 31, 1922

INVENTOR
CARL BORNMANN
BY
Philip S. Hopkins
ATTORNEY

Patented Jan. 13, 1925.

1,522,996

UNITED STATES PATENT OFFICE.

CARL BORNMANN, OF BINGHAMTON, NEW YORK, ASSIGNOR, BY MESNE ASSIGNMENTS, TO ANSCO PHOTOPRODUCTS, INC., OF NEW YORK, N. Y., A CORPORATION OF NEW YORK.

FINDER FOR CAMERAS.

Application filed October 31, 1922. Serial No. 598,150.

*To all whom it may concern:*

Be it known that I, CARL BORNMANN, a citizen of the United States, and a resident in the city of Binghamton, county of Broome, and State of New York, have invented a new and useful Improvement in a Finder for Cameras, of which the following is a description, reference being had to the accompanying drawings, in which like reference numerals indicate like parts.

My invention relates to view finders for cameras, particularly of that class which are intended to be used either in an upright or horizontal position. The principal feature of said invention consists in means for automatically moving the field of the finder into parallel relation to the film when said camera is held either in its upright or horizontal position.

A further object of my invention consists in mounting the automatic means for adjusting the field of said finder entirely independent of the finder supporting means. By this method cheaper construction of the finder and less material in the manufacture thereof than is required in the making of finders as now made, is permitted. Furthermore such construction renders the finder more positive in operation.

My invention also includes a protecting cap or cover which fits over the finder, rendering it dust proof and ornamental. This cap also serves in holding the parts of the finder together, thereby forming a rigid and stable article.

Another object of my invention is to provide a view finder of the class described, with an improved mirror or reflecting surface and mounting therefor.

A still further object is to provide an adjusting means for the mechanism which automatically turns the field of the finder. By this means a positive and accurate positioning of the finder on the camera is made possible.

My invention also includes a method of mounting the view finder on the camera which is greatly simplified, easy to assemble and readily accessible for cleaning or repairing.

Other objects and advantages in details of construction and operation will appear as the description proceeds.

My invention is an improvement over U. S. Patent No. 916,205 granted to W. E. Shanley, March 23, 1909.

In the drawings:

Figure 1 is a plan view of a folding camera in the horizontal position, showing the field of my improved view finder adjusted for said horizontal position.

Figure 2 is a plan view identical with Figure 1 except that the camera and finder are shown in their vertical position.

Figure 3 is a front view of the camera in vertical position showing clearly the means for mounting the finder thereon.

Figure 10 is a bottom plan view of the interior of the finder, showing the arrangement and relation of parts therein.

Figure 4:
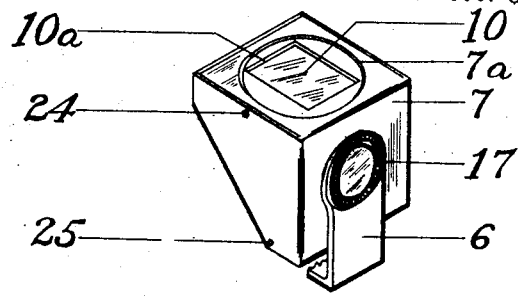
Figure 4 is a perspective view of the finder, the protecting cap being removed.

The body of the camera is indicated generally by the reference numeral 1; 2 indicates the ordinary carrying handle therefor, and 3 refers to the bellows. The bed of the camera is indicated at 4 and the front lens mount thereof is designated by the character 5. These parts are of ordinary construction, they being the usual equipment of any folding camera.

Figure 8:
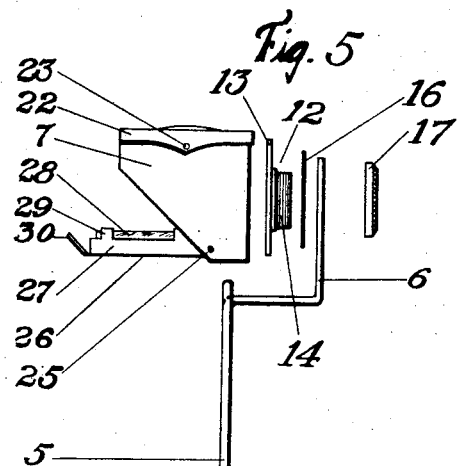
Figure 8 is a side view of the camera lens mount, the upper end of which carries the finder, showing the securing means for said finder in exploded position.

The front lens mount 5 as shown particularly in Figures 1, 3 and 8 is provided with an upstanding angle arm 6. It is on this arm 6 that my improved finder is mounted in the manner hereinafter described.

7 indicates the body portion of my improved finder which is constructed in one piece, said piece being struck from a plate of sheet metal or the like, and folded to form the top sides, bottom, and front, substantially triangular in configuration as shown. The top of said finder is provided with a large circular opening 7ª within which fits the diaphragm, or top mount. This diaphragm, indicated generally at 8, comprises a metal ring having gear teeth 9 cut into the periphery thereof for a predetermined distance around the same. Mounted within this ring 8 is a glass or window 10 of concavo-convex configuration and which projects outwardly through the circular opening 7ª in the top of the finder. The window 10 is masked to form a rectangular view opening. This mask is provided by the ring 8 which has the rectangular aperture 10ª cut therein and fits snugly over the glass 10.

The ring 8, with its masked window 10, is rotatably secured within the finder directly beneath the top thereof by means of two buttons or guides 11 fastened to the under side of the finder top (see Figure 10).

Figure 9:
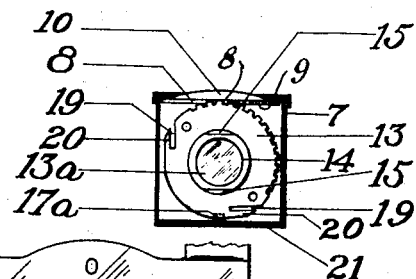
Figure 9 is a front view of the lens mount and my improved finder, parts thereof being broken away to show the interior construction thereof.
Figure 9:
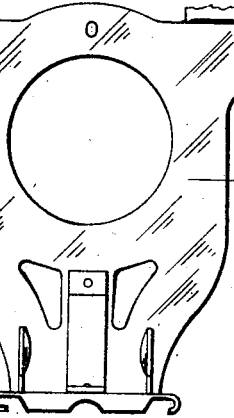

The front of the finder is provided with an opening 11ª through which the finder lens mount projects. This mount, referred to generally as 12, comprises a fan gear 13, which is mounted inside the finder directly back of the front plate thereof, and a lens retaining member 14 which projects through the opening 11ª in the front of said finder and which is externally threaded to receive a retaining ring. The lens carried by said member 14 is shown at 13ª. The projecting lens retaining portion is provided with flat sides indicated at 15 and shown clearly in Figure 9, and extend through a flat-sided opening (not shown) in the arm 6 of the camera lens mount. A washer 16 is placed between said arm 6 and said projecting member and a retaining ring 17 screws on to the end of the member 14 which projects through the arm 6. It will be readily understood from this construction that because of the flat-sided lens retaining member 14 and the flat-sided opening in the arm 6, that the fan gear 13, (being integral with said member 14), is rigidly held in position while the finder body pivots and is free to turn on the lens retaining member. A retaining lug 17ª is struck up through the bottom plate of said finder just back of the fan gear 13. This lug serves to hold said fan gear in position and acts as a guide for said finder when same is rotated.

Figure 6:
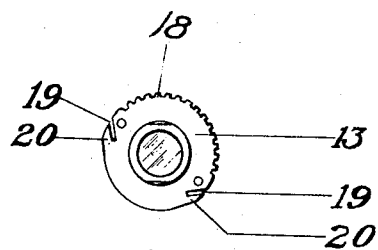
Figure 6 is a detail of the fan gear forming part of the automatic adjusting means.

The fan gear 13 is provided on a portion of its periphery with gear teeth 18 which mesh with the teeth 9 on the top diaphragm ring 8. When the finder, therefore, is turned on its pivot from a vertical to a horizontal position, said top diaphragm will be rotated through an arc of 90 degrees, thus changing the position of the rectangular field of said diaphragm from a vertical to a horizontal position. The fan gear 13 is also provided, as clearly shown in Figure 6, with two notches 19. These notches constitute the adjusting means for the proper positioning of the diaphragm. Such adjustment is secured by spreading or opening said notches to a greater or less degree which results in placing the fingers 20, formed by the cutting of said notches, in position to engage with the narrow bottom plate 21 of the finder when said finder is rotated. In other words, said adjustable fingers 20 act as stops for said finder by engaging said bottom plate upon the completed rotation of the finder in either direction. By this means the position of the diaphragm view opening can be accurately determined in its two positions.

Figure 5:
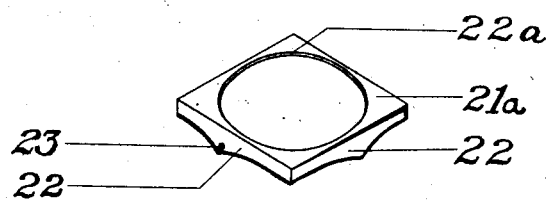
Figure 5 is a detail view of the protecting cap.
Figure 7:
Figure 7 is a detail of the retaining ring by means of which the finder is secured to the camera.

The top or retaining cap for the finder, shown in detail in Figure 5, is indicated at 21ª and, as shown, comprises a plate having flanges 22 extending downwardly over the sides and front thereof, and having cut in the top a circular opening 22ª which permits observation of the diaphragm. The cap 21 snaps into position on the top of the finder and is securely held in place by means of small indented portions 23 in the side flanges of said cap which fit into corresponding indentations 24 in the sides of said finder. This cap 21 serves the additional purpose of securely holding the top and side portions of the finder in closely assembled relation, rendering the finder dust proof and more rigid and stable in construction.

Pivoted at 25 on the sides of said finder, near the bottom thereof, is the mirror holder 26. This holder comprises a plate of sheet metal having side flanges 27 upstanding therefrom, upon which rests the mirror or reflecting surface 28. Retaining tongues 29 are struck from said flanges and clamp over the edges of said mirror, preventing lateral movement thereof and holding the same securely in position. A flange 30 is bent up from the rear of said mirror holding plate, which flange provides a finger piece by means of which said mirror may be lowered to the position shown in Figure 8 for the purpose of cleaning. When in the folded position shown in Figure 4, said flange 30 springs in between the sides of the finder and frictionally holds the mirror in its folded position.

The operation of the device is as follows:

The camera being in a vertical position shown in Figure 2, and the operator desiring to take a horizontal picture, he first turns the camera on its side as shown in Figure 1. By then grasping the finder and turning it bodily so that the diaphragm or top thereof is in sighting position, the rectangular field of said finder is brought into horizontal position corresponding to the position of the film in the camera. The change of position of this field is brought about automatically by virtue of the fan gear held rigid on the camera as described, meshing with the teeth on the diaphragm ring and thus rotating the same as the finder is turned. The amount of rotation of said diaphragm is regulated or controlled by the adjusting notches and fingers 19 and 20.

It will thus be seen that the ordinary operation of partially rotating the finder so that it may serve its purpose both in a horizontal and vertical position results in my improved finder in automatically adjusting the field of view to correspond to the outline of the desired picture.

While the embodiment illustrated and herein described is the preferred form of my invention, it is to be understood that the same is susceptible to various changes in details of construction in parts and I do not, therefore, limit myself to the exact form as shown other than by the appended claims.

I claim:

1. In combination with a camera, a view finder, means for rotatably mounting said finder on said camera, and an adjustable means for automatically adjusting the field of said finder as said finder is partially rotated.

2. In combination with a camera, a view finder, means on said camera upon which said finder is rotatably mounted, means entirely on said finder for automatically adjusting the field of said finder when said finder is partially rotated, and stop means on said first named means for adjustably limiting the movement of said finder.

3. In combination with a camera, a view finder, means for rotatably mounting said finder on said camera, means for automatically adjusting the field of said finder when said finder is partially rotated comprising a diaphragm having peripheral gear teeth thereon and a fixed gear segment in said finder meshing with the teeth on said diaphragm, and adjustable stop means on said fixed gear segment for limiting the movement of said finder in either direction.

CARL BORNMANN.